Patented May 25, 1948

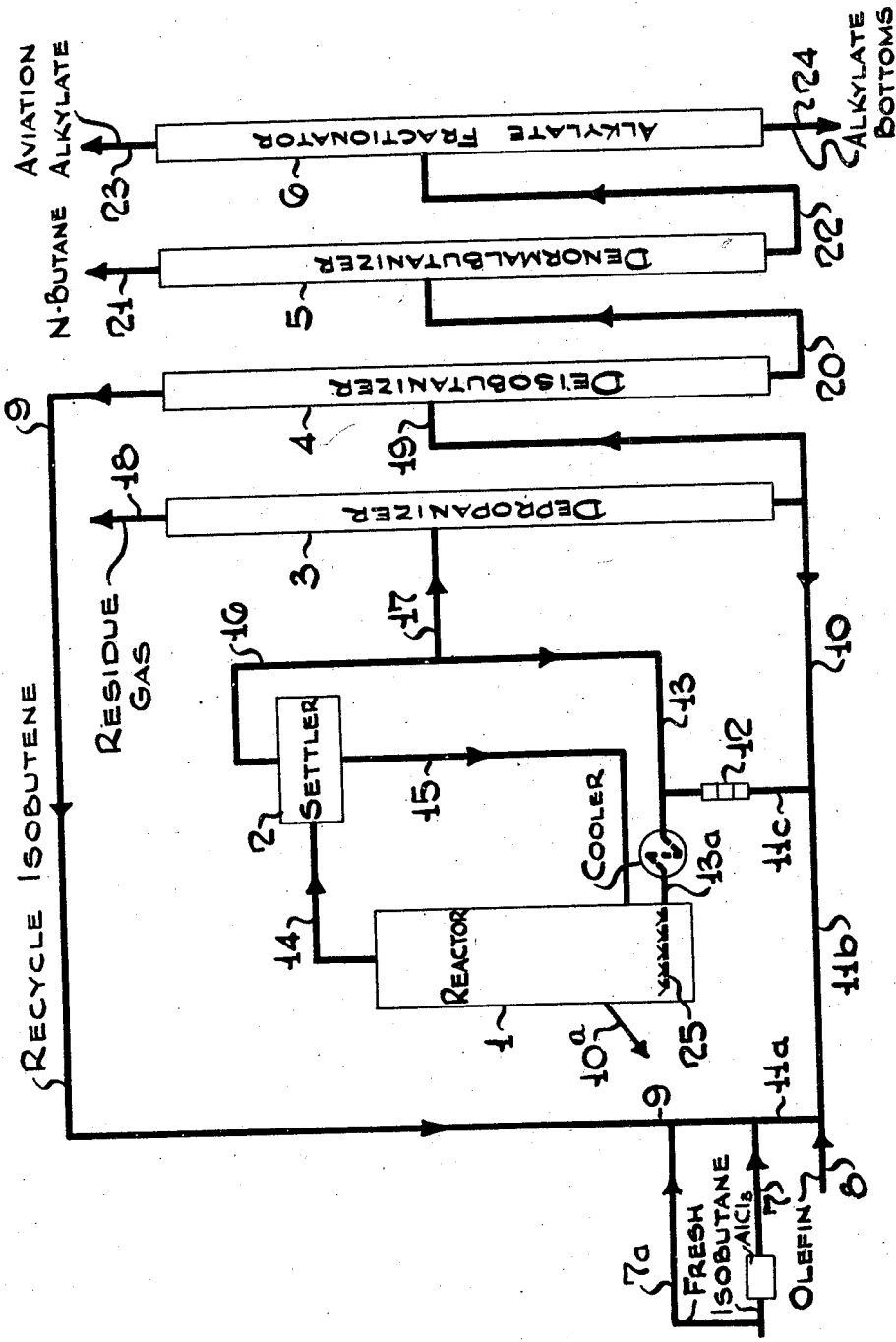

2,442,221

UNITED STATES PATENT OFFICE 2,442,221

ALKYLATION-RECYCLING OF ALKYLATE PRODUCT STREAM FREE OF INERT GASES

Ashley R. Sydnor, Jr., Fanwood, N. J., assignor to Standard Oil Development Company, a corporation of Delaware Application June 19, 1945, Serial No. 600,247

5 Claims. (Cl. 260—683.4)

1

The novel features of my invention are disclosed in the following specification and claims considered in connection with the accompanying drawing.

The object of my invention is to alkylate isoparaffin with olefins in the presence of a suitable catalyst under conditions which will insure maximum yields of high quality product.

Another object of my invention is to alkylate an isoparaffin with an olefin containing not more than three carbon atoms.

I have discovered that in alkylating an isoparaffin with an olefin it is preferable to operate under conditions such that the normally gaseous constituents (including non-condensable gases, such as hydrogen) are maintained in liquid phase in the reaction zone; and this result is accomplished not only by operating under superatmospheric pressure but by recycling sufficient liquid product to the reaction zone, so that normally gaseous materials may be dissolved in the liquid phase, that is, providing in the reaction zone merely liquid phases and not a mixture of liquid and gas phases. The solution of normally gaseous materials is also further aided by a careful fractional distillation of the crude product to remove non-condensable gases such as hydrogen, and also to remove inert gases such as methane, ethane, and propane, before a portion of the crude product is recycled to the reaction zone.

In the accompanying drawing I have shown diagrammatically an apparatus layout in which a preferred modification of my invention may be carried into practical effect.

In the alkylation of isobutane with olefins, using an AlCl₃-hydrocarbon complex catalyst, the reaction is generally carried out in a closed vessel at about 50° F. to 150° F. and 250 to 300 pounds per square inch gauge pressure. Good mixing of reactants and catalyst is maintained by means of propeller stirrers disposed in the reaction zone, by recycling the contents of the reactor through jets, also located in the reaction zone, by means of an external pump, etc. Good results are obtained by maintaining a large excess of isoparaffin, say at least 100 mols of isoparaffin per mol of olefin in the reaction zone. These facts were known prior to my invention. I have now found that improved results are achieved by these means, as long as all the gaseous constituents are maintained in the liquid phase. When, however, the olefins as fed are diluted with inert, non-condensable gases, such as hydrogen and methane, unless the precautions I have noted above are observed, both liquid and gas phases exist in the reactor. The presence of the dissimilar phases makes more difficult the problem of securing adequate mixing, which is necessary to insure that good yields and product quality are secured.

2

Referring in detail to the drawing, I represents a reactor and 7 and 8, respectively, represent fresh isobutane and olefin feed lines. In the drawing, these discharge the isobutane and olefin (e. g. ethylene or propylene) into isobutane recycle line 9, after which the mixture passes via lines 11b and 11c through an orifice mixer 12 and thence flows via line 13a into a jet mixer 25 disposed within reactor 1. The catalyst, an aluminum chloride-hydrocarbon complex, is formed by the reaction of anhydrous aluminum chloride with isoparaffins, such as trimethyl pentanes, etc., convenient sources of said isoparaffins being commercial sulfuric acid alkylate, in particular the C₇-C₈ cut from the alkylate made in this sulfuric acid process. The complex may be "preformed" outside the system shown in the drawing, using hydrogen chloride, methyl chloride (1 to 5 volume per cent of the isoparaffin) as promoter at atmospheric pressure and temperatures above about 150° F. during a period of several hours (say 6 to 8) and then charged to the alkylation unit with the fresh isobutane or it may be formed "in situ" by the addition of anhydrous aluminum chloride directly to the alkylation reactor containing an isoparaffin and formed therein under the same conditions. In general, the initial catalyst is "preformed" and the make-up catalyst is formed "in situ" by periodic additions of anhydrous aluminum chloride to the reactor in solution in the fresh isobutane stream 7. The olefins, isobutane, and aluminum chloride-hydrocarbon complex mix with and contact each other at a temperature of 50° F. to 150° F. in the reactor 1 under a gauge pressure of 250 to 300 pounds per square inch for a sufficient period of time to effect the desired conversion. Thereafter, a crude product is withdrawn from the reactor through line 14, discharged into settler 2 wherein any aluminum chloride-hydrocarbon complex carried over by entrainment separates out and is returned to the reactor via line 15. As previously stated, the upper liquid phase is withdrawn from settler 2 through line 16 and the major portion of the upper liquid phase, say 60% to 98% is recycled to the reactor 1 through line 13 and 13a and the jets 25 in order to provide mixing. The remaining portion of the product is discharged via line 17 into a depropanizer tower 3 from which the residue gas, which contains inert gas from feed, such as hydrogen, methane, ethane, and propane, and any unreacted ethylene and propylene is taken off overhead through line 18, while the bottoms may be recycled via line 10 to reactor 1, at least, in part, the remainder passing via line 19 into a de-isobutanizer 4 from which unreacted isobutane is withdrawn overhead through line 9 and recycled to the reaction zone. The bottoms in tower 4 are withdrawn through line 20 and discharged into tower 5 wherein normal butane is withdrawn through line 21, while the bottoms are withdrawn through line 22 and discharged into a finishing still 6 from which a fraction of the alkylate suitable for inclusion in aviation gasoline is taken off overhead through line 23 and a heavier residual alkylate is taken off through line 24.

Spent catalyst is withdrawn periodically from the system via line 10a.

I have made test runs to determine the utility of my invention and I have secured data which show that when a gaseous olefin such as ethylene or propylene is reacted with liquid isoparaffins in the presence of the $AlCl_3$ catalyst previously described, the process is improved by recycling sufficient liquid product to dissolve and maintain all normally gaseous constituents present in the reaction zone in liquid phase. In these runs I have alkylated isobutane with ethylene and propylene using (1) a mixture of relatively pure olefins (95% purity), and (2) a mixture of olefins containing about 50% inert, non-condensable materials, mainly hydrogen and methane. In the first case, only liquid phases were present in the reactor; while in the second case, both liquid and gas phases were present. The following data indicate that the mixed phase operation (2) is inferior to that in which only liquid phases (1) are present:

|  | (1) | (2) |
|---|---|---|
| Olefin Feed Composition: |  |  |
| Hydrogen, Mol. Per Cent | 0 | 9 |
| Methane | 0 | 36 |
| Ethane | 3 | 5 |
| Ethylene | 65 | 18 |
| Propylene | 30 | 10 |
| Propane | 2 | 22 |
| Mol Ratio of Isobutane to Olefins in Total Feed | 5.7/1 | 5.6/1 |
| Olefin Feed Rate, Gram Mols Ethylene plus Propylene per Hour | 9.4 | 6.8 |
| Reactor Hydrocarbon Recirculation Rate (a measure of mixing), Gals. per Hour | 95 | 90 |
| Reactor Volume, Liters | 22 | 22 |
| Jet Diameter, Inches | 0.138 | 0.138 |
| Jet Pressure Drop, lbs./sq. in | 10 | 10 |
| Reactor Pressure, lbs./sq. in. Gauge Pressure | 275 | 275 |
| Reactor Temperature, ° F | 130 | 130 |
| Per Cent Ethylene Reacted | 96.5 | 92.7 |
| Per Cent Propylene Reacted | 99+ | 99+ |
| Yield of Alkylate, Based on Input Olefins, Weight Per Cent | 262 | 244 |
| Composition of Alkylate, Vol. Per Cent: |  |  |
| $C_5$ | 3 | 6 |
| $C_6$ | 58 | 47 |
| $C_7$ | 19 | 21 |
| $C_8$ | 7 | 7 |
| $C_{9+}$ | 13 | 19 |
| Anti-knock Quality of $C_6$ Cut: ASTM Octane Number | 93.5 | 92.2 |

To recapitulate briefly, my invention has to do with improvements in the alkylation of olefins, such as ethylene and propylene, with an isoparaffin, such as isobutane or isopentane, conducted in the presence of a liquid catalyst such as the aluminum chloride-hydrocarbon complex. The main point of the invention is that only liquid phases are maintained in the reaction zone, and this is accomplished by recycling sufficient product, from which hydrogen, methane, ethane, and propane have been removed by distillation, to dissolve and maintain the normally gaseous constituents in the liquid phase. By so operating, I improve the yield of alkylate and also improve the quality of the alkylate.

While I have described in detail operations in which the catalyst is an aluminum chloride hydrocarbon complex, it is to be understood that many improvements are applicable to any liquid catalyst, adapted to effect the alkylation of isoparaffins with olefins, in particular, those olefins containing not more than three carbon atoms in the molecule. With respect to the aluminum chloride hydrocarbon complex, I have found that good results are obtained by using a catalyst which contains from 35 to 40 per cent hydrocarbon in the complex composition. In physical appearance the hydrocarbon complex is a brown, mobile liquid having a specific gravity of around 1.2, but other forms of this and other liquid catalysts mentioned may be used.

Numerous modifications of my invention following within the spirit thereof may be made by those who are familiar with this art.

What I claim is:

1. In the alkylation of an isoparaffin with a $C_2$ to $C_3$ olefin and mixed with inert gas including hydrogen in the presence of a liquid catalyst at an elevated alkylation temperature and under sufficient pressure to maintain the isoparaffin in the liquid phase, the improvements which comprise maintaining the olefin dissolved in a liquid phase while it is resident in the reaction zone for a sufficient time period to effect alkylation of the isoparaffin in liquid phase; dissolving in the liquid phase the inert gas, including hydrogen, methane, ethane and propane, present in the reaction zone; removing from said reaction zone a liquid alkylate product together with unreacted liquid isoparaffin containing dissolved gas therein, passing this alkylate stream to a separation zone and effecting separation between the catalyst and said alkylate stream, recycling a portion of said alkylate stream directly to said reaction zone, introducing the remaining portion of said alkylate stream into a separation zone wherein said dissolved inert gases, including hydrogen, are removed from this latter alkylate stream, recycling a portion of this latter alkylate stream free of inert gases to said reaction zone, whereby the amount of said inert gases present in said reaction zone is diminished, and handling the remaining portion of this latter alkylate stream free of inert gases in a manner to segregate the alkylate product.

2. The method of claim 1, in which the isoparaffin alkylated is isobutane and the olefin is ethylene.

3. The method of claim 1, in which the isoparaffin alkylated is isobutane and the olefin is propylene.

4. The method set forth in claim 1, in which the catalyst is an aluminum chloride hydrocarbon complex containing 35–40 weight per cent hydrocarbon.

5. The method set forth in claim 1, in which the alkylation temperature is within the range of from about 50° F. to 150° F. and the superatmospheric pressure maintained in the reaction zone is in the range from 250–300 pounds per square inch gauge.

ASHLEY R. SYDNOR, JR.

REFERENCES CITED

The following references are of record in the file of this patent:

UNITED STATES PATENTS

| Number | Name | Date |
|---|---|---|
| 2,354,652 | Carmody et al. | Aug. 1, 1944 |
| 2,363,264 | Rosen | Nov. 21, 1944 |
| 2,399,093 | Bonnell et al. | Apr. 23, 1946 |